Figure 1:
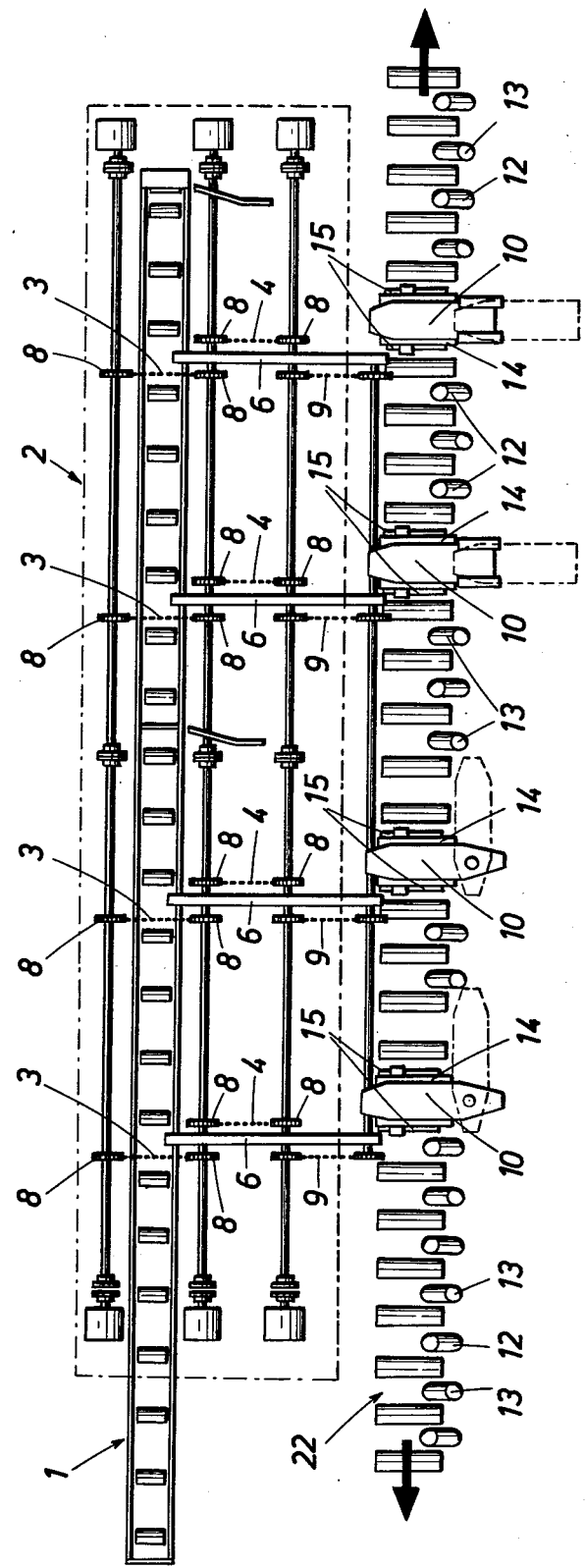

United States Patent [19]

Durnig

[11] 4,120,406
[45] Oct. 17, 1978

[54] APPARATUS FOR FORMING A STACK COMPOSED OF LAYERS OF ROUND-SECTION ELONGATED ITEMS

[75] Inventor: Herbert Durnig, Linz, Austria

[73] Assignee: Vereinigte Osterreichische Eisen- und Stahlwerke - Alpine Montan Aktiengesellschaft, Vienna, Austria

[21] Appl. No.: 796,703

[22] Filed: May 13, 1977

[30] Foreign Application Priority Data

May 24, 1976 [AT] Austria .................................. 3790/76

[51] Int. Cl.² .......................................... B65G 57/22
[52] U.S. Cl. ...................................... 214/6 N; 100/7;
214/1 P; 214/6 H; 214/6 S; 214/6 DK
[58] Field of Search ........... 214/6 N, 6 H, 6 S, 6 DK,
214/8, 1 P; 100/7

[56] References Cited

U.S. PATENT DOCUMENTS

| | | | |
|---|---|---|---|
| 3,262,246 | 7/1966 | Olsen et al. | 100/7 |
| 3,627,150 | 12/1971 | Kazeef et al. | 214/6 H |
| 3,856,158 | 12/1974 | Currie | 214/6 DK |
| 3,871,288 | 3/1975 | White | 214/6 H |
| 3,941,639 | 3/1976 | Maroschak | 100/7 |
| 3,956,982 | 5/1976 | Hill et al. | 214/6 H |

Primary Examiner—Albert J. Makay
Assistant Examiner—Ross Weaver
Attorney, Agent, or Firm—Kurt Kelman

[57] ABSTRACT

Rods or tubes are arranged in a first plurality of layers in which their number increases by one from layer to layer, and in a succeeding plurality of layers wherein they similarly decrease in number. A stack support can be lowered from an uppermost elevation in increments equal to the layer heights. A lateral backing stop comprising two superposed rollers is connected to the stack support and lateral backing arms are spaced from the stop and move relative to the stack support so that the extent of the arms above the support increases as it is lowered. The stop, stack support and arms define four successive sides of a regular hexagonal prism. A plurality of carrying arms are closely spaced above the uppermost elevation of the stack support to receive each layer and support it, the carrying arms being operable to move therewith to a position over a portion of the support between the stop and backing arms, and then to a position beyond the stop. The stop is arranged to engage each layer as the carrying arms move out of this position so that the layer is caused to be deposited on the stack support between the stop and the backing arms. The backing arms back the layers of the first plurality deposited on the stack support.

7 Claims, 7 Drawing Figures

FIG.3
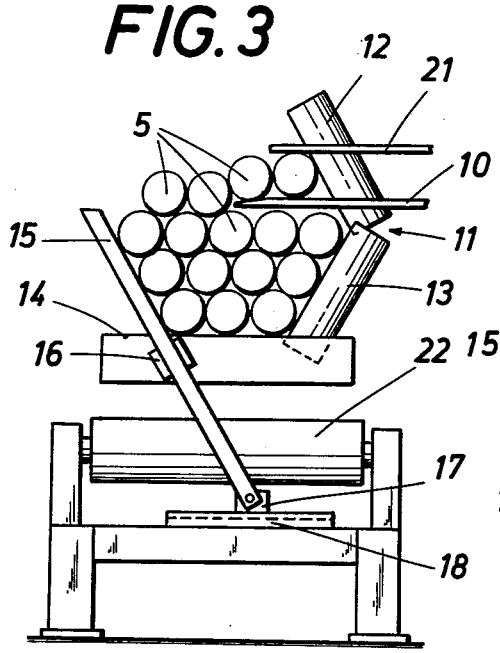
FIG.4
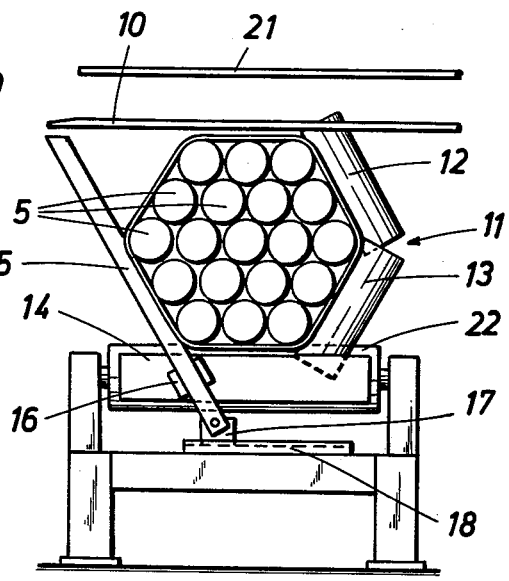
FIG.5
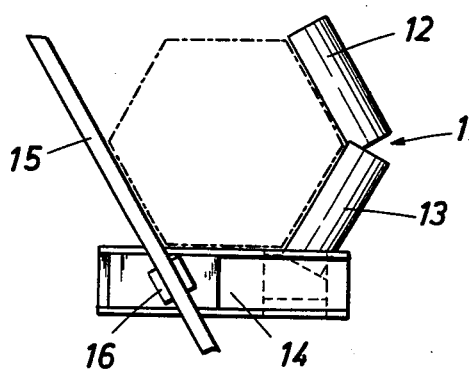
FIG.6
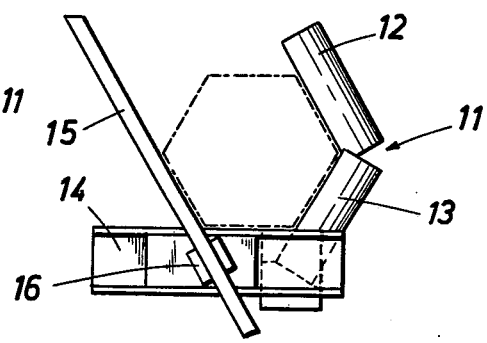
FIG.7

APPARATUS FOR FORMING A STACK COMPOSED OF LAYERS OF ROUND-SECTION ELONGATED ITEMS

This invention relates to apparatus for stacking tubes or round-section rods in layers, comprising layer-forming means for receiving stackable items and for arranging them in layers, a stack support, which is adapted to be lowered in increments equal to the height of a layer, and carrying arms for receiving individual layers of stackable items from the layer-forming means and for supporting each layer and moving it to a position in which the layer is closely spaced over the stack support, or over the uppermost layer of a stack which has already been formed on the stack support, whereafter the carrying arms are movable in a direction which is parallel to the layer supported by them while said layer is held by a stop against moving with the carrying arms and is thus caused to be deposited on the stack support or said uppermost layer.

Known apparatus of that kind is used to stack items which are rectangular in cross-section or have such a cross-section that superimposed items can positively interengage. Such known apparatus cannot be used to stack tubes or round-section rods because the apparatus can be used only to form inherently stable stacks. When it is desired to stack tubes or round-section rods, these items must be inserted into holding pockets and must then be tightly bound with steel straps so that stacks are obtained which can be transported and stored. The resulting stacks have the disadvantage that the individual tubes or round-section rods are not fixed in position in the stack but can shift relative to each other when the stack is handled, and this may cause the stack to become loose within the steel straps with which it has been bound.

In order to avoid these disadvantages, stacks have been formed which are rectangular in cross-section because the stackable items are firmly held together in a stack having that configuration and the items can be more closely packed in such stacks. To form a stack which is hexagonal in cross-section, the tubes or round-section rods are collected in troughs which have an inside cross-section in the configuration of one-half of a regular hexagon. The tubes placed in such trough must be aligned by hand if exact stacks are to be formed. To avoid this expensive and dangerous manual work, it has already been proposed (Opened German Specification No. 2,245,117) to use a trough which consists of stringers or sheet metal elements and in which the bottom is not formed by one side of the hexagon but the trough defines four sides of a hexagon and the central corner of this hexagon constitutes the lowermost point of the trough. In such trough, tubes which have been placed into the trough will roll along one hexagon side of the angled trough bottom toward the other and will thus assume defined positions. As the stack is built up, the angled trough bottom is lowered to provide space for additional tubes. Whereas the trough bottom is lowered, the side walls adjoining the bottom are not lowered because otherwise they could not provide the lateral backing which is required for the built-up stack. That known arrangement has the disadvantage that the tubes must be individually placed into the trough and that the platform provided with a singling device for delivering the tubes must be shifted relative to the trough by one tube width whenever a tube has been displaced. This requires expensive control means, which are liable to be deranged. Besides, the arrangement does not ensure a satisfactory formation of stacks because the tubes supported on an inclined surface tend to roll over previously deposited tubes.

It is an object of the invention to avoid these disadvantages and to provide an apparatus which serves to stack tubes or round-section rods in layers and by which stacks which are hexagonal in cross-section can be formed quickly and in a simple manner and without need for special control means.

In apparatus of the kind described first hereinbefore, this object is accomplished in accordance with the invention in that the stop constitutes a lateral backing for the stack and is arranged to move in unison with the stack support and consists of two sections, which are arranged one above the other and inclined toward each other and together with the stack support and an additional lateral backing for the stack defines four successive side faces of a regular hexagonal prism, which has a horizontal axis and defines the envelope of the stack, in which the numbers of stackable items in adjacent layers differ by one, that the additional backing is mounted in the stack support for movement relative thereto and has an upper end disposed below the carrying arms and is arranged to incrementally increase in effective length in response to the incremental lowering of the stack support. Because the stack is laterally supported by two backings which are inclined to each other at an angle of 60°, round-section items can be assembled in a stack which has the shape of one-half of a hexagonal prism, provided that the layer-forming means form stackable layers in such a manner that each succeeding layer contains one more stackable item than the next preceeding layer. Because one of the lateral backings constitutes also the stop which causes each layer to be pushed off the carrying arms when the same have moved the layer over the stack and are then removed therefrom, it is ensured that these layers containing different numbers of items are superimposed in such a manner that the tubes or round-section rods of the uppermost layer are disposed in the triangular recesses between adjacent tubes or round-section rods of the next lower layer. When a layer, has been deposited and the stack support is then lowered by an increment that is equal to the height of a layer, the stop is automatically adjusted accordingly because it is moved in unison with the support. Because the stop is inclined from the carrying arms, it will move not only in a direction which is normal to the layer but also in a direction which is parallel to the layer. For this purpose the carrying arms must obviously be closely spaced above the uppermost layer of the stack, as is required also to reduce noise and is generally usual. When the layer disposed in the middle of the height of the desired stack which is hexagonal in cross-section, i.e., the layer which has the largest width, has been deposited, each of the subsequently deposited layers must contain one stackable item less than the next lower layer. This can easily be accomplished by suitable layer-forming means. The stop which strips the layers from the carrying arms is then constituted by the uppermost portion of one lateral backing whereas a lateral backing on the other side is no longer required because the layers which are now stacked no longer protrude beyond the previously stacked layers.

To enable the carrying arms to move each stackable layer to a position over the stack, that lateral backing which is opposite to the stripping stop must not protrude above the uppermost layer which has already been stacked. For this reason, that lateral backing is mounted in the stack support for movement relative thereto and its upper end is disposed below the carrying arms whereas the effective length of this backing must be incrementally increased as the stack support is incrementally lowered.

To accomplish this incremental increase in length in a simple manner, the additional lateral backing consists of at least two backing arms, which are held in the stack support so that they are displaceable in the peripheral direction of the adjacent side face of the prism whereas they are held against displacement in the direction in which the stack support is lowered so that the lateral backing has always the same elevation.

Because in such arrangement the additional lateral backing does not move in unison with the stack support, as does the oppositely disposed stop, the additional lateral backing will move relative to the tubes or round-section rods engaging it so that these tubes or round-section rods may roll over adjacent tubes or round-section rods of the same layers and may thus move from a given layer to the next upper one. To avoid this, it is a further feature of the invention that the additional lateral backing is provided with a covering strip on that side which faces the stack and said strip is trained around reversing rollers secured to the additional lateral backing and is connected to the stack support to move in unison therewith. As a result, a relative movement between the covering strip and the stacked items contacting the same is prevented.

For a similar purpose, a holding-down member may be used which is spaced above the carrying arms by a distance which is substantially as large as the diameter of a stackable item. That holding-down member prevents stackable items on the carrying arms from rolling one over another.

To ensure that the completed stack which has been bound with steel straps can easily be removed in its longitudinal direction from the stack support, the stop consists of at least two rollers, which form the upper section, and at least two rollers, which form the lower section, and the rollers of each section are horizontally spaced and have a shell in a length which is at least as large as the width of a side face of the prism, whereas the axis of rotation of each roller is parallel to the peripheral direction of the adjacent side faces of the prism and at right angles to the side edges of the prism. Whereas these rollers permit the stack to be removed easily from the stack support, they will provide a lateral backing for the stack and retain each layer against being moved away from the stack in unison with the carrying arms when the latter are moved away from the layer which is supported by them.

The apparatus according to the invention can be adjusted to handle stackable items having different outside diameters and to form stacks consisting of different numbers of layers, which may also differ in size, if, in accordance with the invention, the stop is adjustable in height relative to the stack support and the additional lateral backing pivoted to a support which is adjustable relative to the stop so as to change the distance between the additional lateral backing and the stop. These adjustments result in a change of the side length of the hexagonal cross-section of the prism.

It is apparent that the operation of the apparatus according to the invention for stacking layers of tubes or round-section rods will result in stacks which have the shape of a regular hexagon in cross-section and in which the stackable items are arranged in such a manner that they cannot shift relative to each other when the stack has been firmly bound with steel straps. For this reason the resulting stacks are stable and the items comprised in each stack cannot become loose in the binding means when the stack is compactly stored together with similar stacks.

Figure 2:
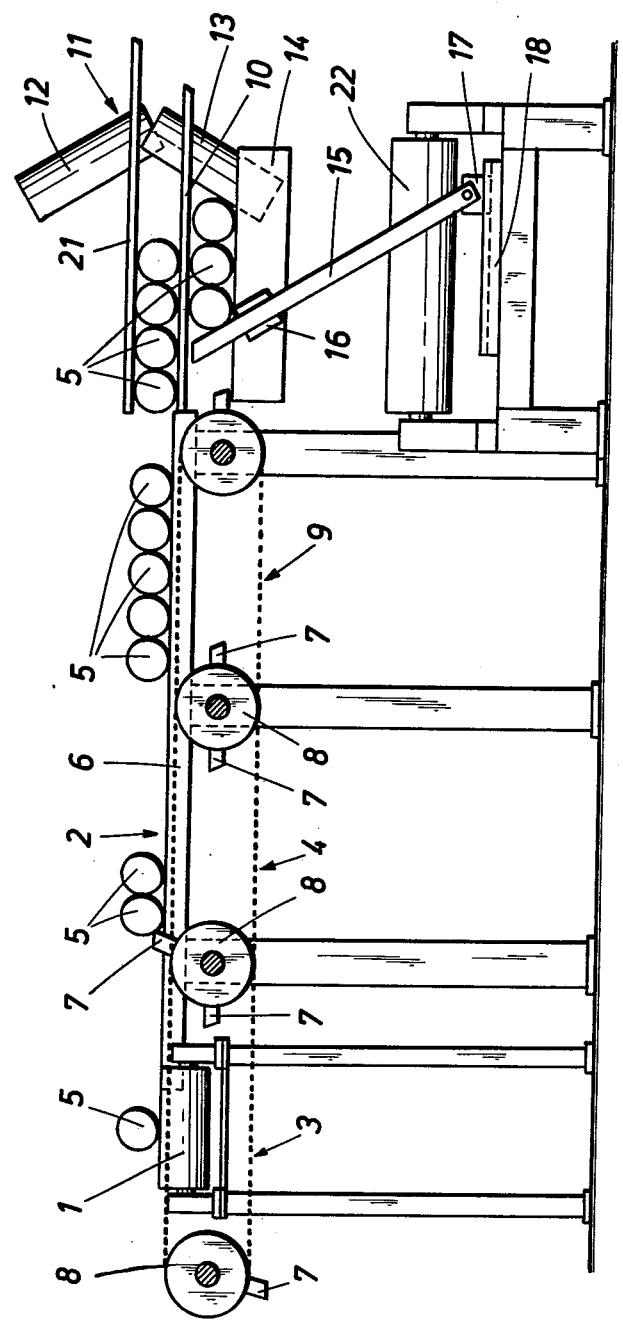

An embodiment of the invention is shown diagrammatically and by way of example in the drawings, in which FIG. 1 is a top plan view showing apparatus according to the invention for stacking layers of tubes or round-section rods, FIG. 2 is a transverse sectional view showing the apparatus of FIG. 1 on an enlarged scale, FIGS. 3 and 4 are transverse sectional views showing the actual stacking means in two different positions, FIGS. 5 and 6 show how the stacking means can be adjusted in adaptation to different sizes of stacks, and FIG. 7 shows the special design of the lateral backing which is mounted in the stack support.

The items to be stacked, consisting of tubes or round-section rods, are delivered in their longitudinal direction by means of a roller conveyor 1 to layer-forming means 2, which substantially comprise two transverse conveyors 3 and 4, which are arranged one behind the other and convey the stackable items on overlapping paths so that the stackable items 5 which have been removed from the roller conveyor 1 by the conveyor 3 are conveyed on the latter to the conveyor 4. During their conveyance by the conveyors 3 and 5, the stackable items are supported by slide rails 6, which define a slide plane and along which the stackable items are moved by flights 7, which are secured to endless chains and protrude therefrom beyond said slide plane. The endless chains are trained around reversing sprockets 8.

The tubes 5 engaged by the transverse conveyor 3 are counted by a counter, which is not shown and which starts the drive for the transverse conveyor 4 when a predetermined count has been reached. Tubes 5 accumulate adjacent to the conveyor 4 when the same is at a standstill, and when the conveyor 4 is operated it delivers the resulting stackable layer to a further transverse conveyor 9, which delivers the tubes to the stacking mechanism proper. It is apparent that the transverse conveyor 9 constitutes virtually a buffer.

Under the control of a storage device, the counter is successively preset to counts which increase by one from each layer to the next and is then successively preset to counts which decrease by one from each layer to the next. In this way the numbers of tubes 5 in successive layers formed by the layerforming means 2 will differ by one so that these layers can be used in forming a stack which has the configuration of a regular hexagon in cross-section.

Each layer which has been delivered from the layer-forming means 2 to the transverse conveyor 9 is delivered by the latter to carrying arms 10, by which the layer can be deposited on the previously formed stack. This is particularly apparent from FIGS. 2 to 4. For this purpose the carrying arms 10 disposed over the previously formed stack are withdrawn in a direction which is parallel to the stackable layer resting on the arms whereas this layer is retained by a stop 11 so that it does not move with the arms 10. The stop 11 consists of two sections, which are disposed one above the other and each of which comprises rollers 12 or 13 and is movable in unison with the stack support 14. Whenever a layer has been deposited, the stack support 14 must be lowered by a distance which is equal to the height of the layer so that the carrying arms 10 can be moved to a position adjacent to the conveyor 9 to receive a new layer therefrom.

To cause the layer resting on the carrying arms 10 to be stripped from said arms, the latter can be moved transversely to the longitudinal direction of the tubes 5 or can be pivotally moved, as is indicated in dash-dot lines in FIG. 1.

To ensure that the stack falls apart when it has not yet been bound with steel straps, the stack must be backed by lateral backing means. Desirably, one lateral backing means is formed by the stop 11. The other lateral backing means comprise a plurality of backing arms 15, which are longitudinally slidably mounted in a track 16, which is carried by the stack support 14. The backing arms 15 are pivoted to a support 17, which can slide in a rail 18 so that it is displaceable only transversely to the direction in which the stack support 14 is lowered. As a result, the backing arms are held against a vertical displacement and a descent of the stack support 14 causes the backing arms 15 to be displaced relative to the stack support 14 in the direction of the track 16 so that the backing arms 15 are maintained at the same elevation and their effective backing length is increased by an amount which is equal to the height of one layer whenever the stack support 14 is lowered.

Because the displacement of the backing arms 15 relative to the stack support 14 results also in a relative movement between the backing arms 15 and the tubes 5 in contact therewith, the rolls might roll one over another so that the arrangement of the layers in the stack might be disturbed. To avoid this, the backing arms 15 may be provided with a covering strip 19, which is disposed on that side of the backing arm which faces the stack. The covering strip 19 is trained around reversing rollers 20, which are fixed to the backing arms, and is connected at both ends to the stack support, as is shown in FIG. 7. Because the covering strip 19 is connected to the stack support 14, the covering strip 19 cannot move relative to the stack support 14 and relative to the stack so that a rolling of one tube over another is reliably prevented.

Since tubes might roll over one another also as a layer is stripped from the carrying arms 10, a holding-down member 21 is desirably provided above the carrying arms and either moves in unison with the carrying arms 10, as is shown in FIGS. 2 to 4, or is stationary during a movement of the carrying arms.

When the stack of layers has been formed in the manner shown in FIGS. 2 to 4, it may be tightly bound with steel straps and can be carried off in its longitudinal direction on a roller conveyor 22. Because the lateral backing means 11 and 15 define sides of a regular hexagon and the layers of the stack contain stackable items in different numbers, the envelope of the resulting stack constitutes a regular hexagonal prism. This configuration of the stack ensures that the individual tubes of the stack are immovably held in the straps with which the stack has been bound so that the stack of tubes can be handled without danger. Besides, a plurality of such stacks can be juxtaposed and superimposed in a compact arrangement.

To enable a change of the size of the stack to be formed, the stop 11 and the backing member 15 can be adjusted relative to the stack support 14. Stacks differing in size can be obtained when the stop 11 is adjusted in height and the backing member 15 is laterally adjusted, as is illustrated in FIGS. 5 and 6. It will be understood without further explanation that it is also possible to make such adjustments that the resulting stack has the configuration of the triangular prism.

What is claimed is:

1. Apparatus for forming a stack composed of layers of round-section elongated items, which comprises
   layer-forming means for receiving said items and arranging them in a first plurality of layers in which the number of elongated items increases by one from each layer to the next, and in a succeeding plurality of layers in which the number of elongated items decreases by one from each layer to the next,
   a stack support, which is adapted to be lowered from an uppermost elevation in increments equal to the height of one of said layers,
   first lateral backing means comprising two sections, which are disposed one above the other and connected to said stack support to move in unison therewith,
   second lateral backing means which are horizontally spaced from said first backing means and protrude above and below said stack support and are constrained to move relative thereto in such a manner that the extent of said second backing means above said stack support increases as said stack support is lowered,
   said two sections of said first backing means, said stack support, and said second backing means defining four respective successive side faces of a regular hexagonal prism having a horizontal axis,
   said apparatus further comprising a plurality of carrying arms which are closely spaced above said uppermost elevation and spaced above said second backing means and adapted to receive each of said layers from said layer-forming means and to support said layer and operable to move therewith to a position over a portion of said stack support which is disposed between said first and second backing means, and then to move out of said position beyond said first backing means in a direction which is parallel to said layer,
   said first lateral backing means being arranged to engage each of said layers supported by said carrying arms as they are moved out of said position, so that said layer is held against moving with the carrying arms out of said position and is caused to be deposited on said stack support between said first and second backing means,
   said first backing means being adapted to back all said layers thus deposited on said stack support,
   said second backing means being adapted to back said layers of said first plurality thereof which have thus been deposited on said stack support 2. Apparatus as set forth in claim 1, in which
   said second backing means comprise at least two backing arms, each of which is connected to the stack support so as to be movable relative thereto in the peripheral directions of those side faces of said prism which adjoin the side face thereof defined by said second backing means, and
   means are provided which hold said arms against a vertical displacement.

3. Apparatus as set forth in claim 1, in which reversing rollers are fixed to said second backing means above and below said stack support and a covering strip is disposed on that side of said second backing means which faces said first backing means and is trained around said rollers and connected to said stack support.

4. Apparatus as set forth in claim 1, which comprises holding-down means disposed adjacent to said carrying arms and spaced above the same by a distance which is substantially as large as the outside diameter of one of said elongated items.

5. Apparatus as set forth in claim 1, in which each of said sections of said first backing means comprise at least two horizontally spaced apart rollers, which have a shell in a length which is at least as large as the peripheral width of a side face of said prism and are rotatable on axes which are parallel to the peripheral directions of respective adjacent sides of said prism and at right angles to the longitudinal edges of said prism.

6. Apparatus as set forth in claim 1, in which said first backing means are adjustable in height relative to said stack support.

7. Apparatus as set forth in claim 1, in which a slide track is mounted in said stack support and extends parallel to the peripheral direction of that side face of said prism which is defined by said second backing means, said slide track is horizontally adjustable toward and away from said first backing means, a second support is mounted in a fixed elevation below said stack support and horizontally slidable toward and away from said first backing means, and said second backing means are pivoted to said second support and longitudinally slidably mounted in said slide track.

* * * * *